United States Patent
Kvieska et al.

(10) Patent No.: US 10,753,465 B2
(45) Date of Patent: Aug. 25, 2020

(54) DEVICE FOR SYNCHRONIZATION OF A PINION ON A GEARBOX SHAFT IN REGENERATIVE MODE, AND CORRESPONDING METHOD AND MOTOR VEHICLE

(71) Applicant: RENAULT s.a.s., Boulogne-Billancourt (FR)

(72) Inventors: Pedro Kvieska, Versailles (FR); Ludovic Merienne, Gif-sur-Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 16/099,847

(22) PCT Filed: Apr. 26, 2017

(86) PCT No.: PCT/FR2017/050988
§ 371 (c)(1),
(2) Date: Nov. 8, 2018

(87) PCT Pub. No.: WO2017/194851
PCT Pub. Date: Nov. 16, 2017

(65) Prior Publication Data
US 2019/0113137 A1    Apr. 18, 2019

(30) Foreign Application Priority Data
May 9, 2016  (FR) ...................... 16 54135

(51) Int. Cl.
*B60W 10/08* (2006.01)
*F16H 61/04* (2006.01)
(Continued)

(52) U.S. Cl.
CPC ......... *F16H 61/0403* (2013.01); *B60K 6/365* (2013.01); *B60K 6/48* (2013.01);
(Continued)

(58) Field of Classification Search
None
See application file for complete search history.

(56) References Cited

U.S. PATENT DOCUMENTS 5,318,142 A    6/1994  Bates et al.
6,006,620 A *  12/1999 Lawrie ................... B60K 6/48
                                             74/335
(Continued)

FOREIGN PATENT DOCUMENTS

DE    10 2005 016 117 A1   7/2006
WO    WO 97/08439 A1       3/1997
(Continued)

OTHER PUBLICATIONS

International Search Report dated Aug. 18, 2017 in PCT/FR2017/050988 filed on Apr. 26, 2017.
(Continued)

*Primary Examiner* — Justin Holmes
(74) *Attorney, Agent, or Firm* — Oblon, McClelland, Maier & Neustadt, L.L.P.

(57) ABSTRACT

A device synchronizes primary speed of a primary shaft receiving an electrical torque from an electric machine with a secondary speed lower than the primary speed of a secondary transmission shaft. The primary shaft and secondary shaft are decoupled. The primary shaft has a kinetic energy associated with the primary speed. The device provides electrical braking torque to the primary shaft until the primary speed is substantially equal to the secondary speed. The device also at least partially recovers, in the form of electrical energy, the kinetic energy lost by the primary shaft and transmits the electrical energy to an energy storage device.

14 Claims, 4 Drawing Sheets

(51) Int. Cl.
  *B60K 6/365*    (2007.10)
  *B60W 20/14*    (2016.01)
  *B60K 6/48*     (2007.10)
  *B60L 15/20*    (2006.01)

(52) U.S. Cl.
  CPC ......... *B60L 15/2009* (2013.01); *B60W 10/08* (2013.01); *B60W 20/14* (2016.01); *B60K 2006/4825* (2013.01); *B60Y 2200/91* (2013.01); *B60Y 2200/92* (2013.01); *B60Y 2300/18125* (2013.01); *F16H 2061/0422* (2013.01); *F16H 2306/48* (2013.01)

(56) References Cited

U.S. PATENT DOCUMENTS

| | | |
|---|---|---|
| 2002/0032097 A1 | 3/2002 | Koelle et al. |
| 2011/0034296 A1 | 2/2011 | Stervik |
| 2011/0167956 A1* | 7/2011 | Holmes .................... B60K 6/48 74/665 B |
| 2012/0115675 A1* | 5/2012 | Gluckler .................. B60K 6/48 477/5 |
| 2014/0352491 A1* | 12/2014 | Ross ........................ B60K 6/42 74/661 |
| 2016/0040779 A1 | 2/2016 | Vespasien et al. |
| 2016/0052382 A1* | 2/2016 | Clark ....................... B60K 6/26 477/5 |
| 2017/0101101 A1* | 4/2017 | Cho ................ B60W 30/18127 |

FOREIGN PATENT DOCUMENTS

| | | |
|---|---|---|
| WO | WO 2009/136819 A1 | 11/2009 |
| WO | WO 2014/162077 A1 | 10/2014 |

OTHER PUBLICATIONS

French Search Report dated Jan. 25, 2017 in FR 1654135 filed on May 9, 2016.

* cited by examiner

DEVICE FOR SYNCHRONIZATION OF A PINION ON A GEARBOX SHAFT IN REGENERATIVE MODE, AND CORRESPONDING METHOD AND MOTOR VEHICLE

1. FIELD OF THE INVENTION

The invention relates to the field of gear changes in hybrid or electric motor vehicles equipped with an automatic transmission. It relates more particularly to a device for synchronization of a primary shaft with a secondary shaft. It also relates to a corresponding motor vehicle and method.

2. PRIOR ART

The invention is applicable to any parallel-shaft transmission, in which changes of transmission ratio with torque interruption take place by displacement of a means of coupling between two speed pinions rotating freely on a shaft connected to the vehicle wheels.

It finds non-limitative application on a hybrid transmission for a motor vehicle equipped with a combustion engine and with an electric driving machine, provided with two concentric primary shafts, each carrying at least one step-down pinion on a secondary shaft connected to the vehicle wheels and one first means of coupling between two primary shafts capable of occupying three positions, in which: the combustion engine is decoupled from the kinematic train connecting the electrical machine to the wheels (first position), the combustion engine drives the wheels with or without the assistance of the electrical machine (second position) or the combustion engine is coupled to the electrical machine in order to add their torques (third position).

Figure 1:
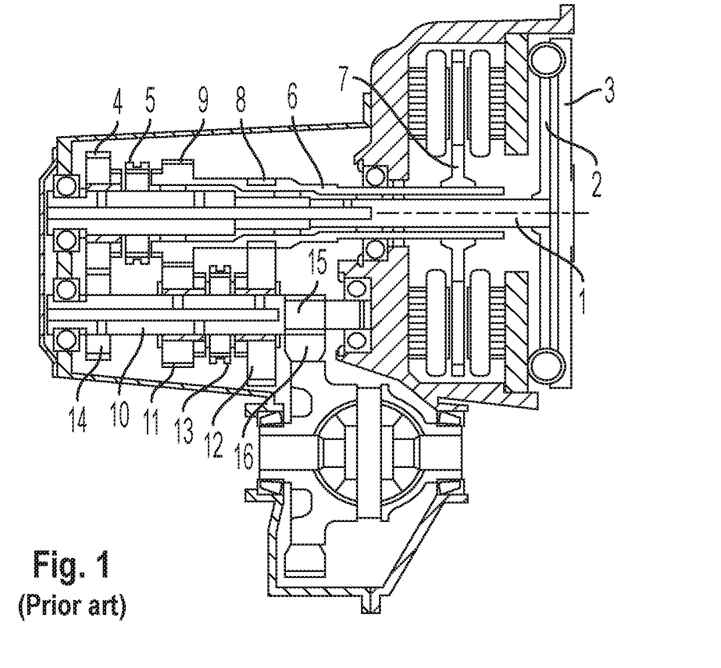
FIG. 1 shows a kinematic train of a hybrid transmission in neutral and at its two electrical ratios in the prior art.

FIG. 1 describes a non-limitative example of a hybrid transmission based on this architectural principle. This transmission is provided with a solid primary shaft 1 connected directly by way of a filtration system (damping hub, twin damping or other flywheel) 2 to the inertial flywheel 3 of a combustion engine (not represented). Solid shaft 1 carries an idler pinion 4 capable of being connected therewith by a first coupling system 5 (clutch, synchronizer or other type of progressive or non-progressive coupler). A hollow primary shaft 6 is connected to the rotor of an electrical machine 7. Hollow shaft 6 carries two fixed pinions 8, 9. It may be connected to the other solid primary shaft 1 by way of coupling system 5. A secondary shaft 10 carries two idler pinions 11 and 12. It is possible to connect idler pinions 11, 12 to the primary shaft by way of a second coupling system 13 (clutch, synchronizer or other type of progressive or non-progressive coupler). Secondary shaft 10 also carries a fixed pinion 14 and a pinion 15 that steps down to a differential 16 connected to the vehicle wheels.

As indicated hereinabove, first coupling means 5 may occupy at least three positions, in which:

the combustion engine is decoupled from the kinematic train connecting electrical machine 7 to the wheels (sliding pinion at the center, as in FIG. 1), the combustion engine drives the wheels with or without the assistance of the electrical machine (sliding pinion at the left), and the combustion engine and electrical machine 7 are coupled in such a way that their respective torques are added in the direction of the wheels (sliding pinion at the right).

Figure 2A:
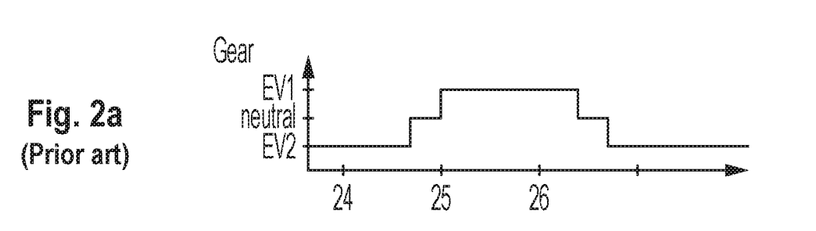
FIG. 2a represents changes of transmission ratios in the course of time in the prior art.
Figure 2B:
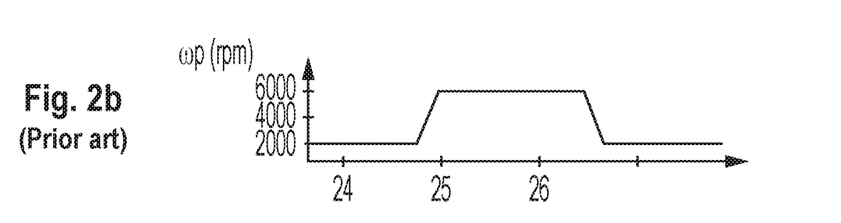

The driving comfort of a vehicle equipped with an automatic transmission depends largely on the time required for a gear shift. A gear shift necessitates reducing a speed difference between the speed of the primary shaft and the speed of the secondary shaft multiplied by a reduction ratio, which reduction ratio depends on the engaged transmission ratio. Coupling of the primary and secondary shafts is possible only when the speed difference drops below a certain threshold. As represented in FIGS. 2a and 2b, during a downshift, for example from a transmission ratio EV2 to a transmission ratio EV1 in FIG. 2a, the primary shaft must be accelerated, for example to change from a primary speed ωp of 2000 rpm to a primary speed ωp of 6000 rpm in FIG. 2b; during an upshift, for example from a transmission ratio EV1 to a transmission ratio EV2 in FIG. 2a, the primary shaft must be decelerated, for example to change from a primary speed ωp of 6000 rpm to a primary speed ωp of 2000 rpm in FIG. 2b. In FIG. 1, transmission ratio EV1 corresponds to pinions 8 and 12, wherein clutch 13 is positioned at the right and transmission ratio EV 2 corresponds to pinions 9 and 11, wherein clutch 13 is positioned at the left.

French patent applications FR2988799 and FR3003620 suggest, for a hybrid vehicle, using an electrical machine of the vehicle to synchronize the primary shaft with the secondary shaft of the vehicle, in particular to provide torque during a downshift. For an upshift, a portion of the kinetic energy associated with the primary speed of the primary shaft is traditionally dissipated by mechanical losses in order to brake the primary shaft.

Within a context of reducing the energy consumption of vehicles, it is interesting to recover, in the form of electrical energy in a battery, the kinetic energy derived from the deceleration of the primary shaft during an upshift. Inasmuch as the envisioned objective is to achieve short synchronization times, on the order of 200 ms, the powers involved are relatively high, on the order of 50 kW. Now, when the battery reaches a charge level close to 100%, for example 90%, it is able to accept only little power. This point constitutes an obstacle to energy recovery during an upshift.

Furthermore, to permit a fast downshift, it is necessary to deliver high power to the electrical machine in order to accelerate the primary shaft. Now, when the battery reaches a charge level close to 0%, for example 10%, it is able to supply only little power. This point constitutes an obstacle to driving comfort.

3. OBJECTIVES OF THE INVENTION

The invention proposes a solution aimed at alleviating the aforesaid disadvantages. One objective of the invention is to permit better utilization of the energy by virtue of the use of a regenerative mode of the electrical machine in order to synchronize the shafts during an upshift. The invention also has improving the driving comfort as an objective.

4. SUMMARY OF THE INVENTION

The invention relates to a device for synchronization of a primary speed of a primary shaft receiving an electrical torque from an electrical machine, with a secondary speed lower than the primary speed of a secondary transmission shaft, wherein the primary and secondary shafts are decoupled and the primary shaft has a kinetic energy associated with the primary speed, wherein the device is characterized in that it is provided with means for delivering an electrical braking torque to the primary shaft until the primary speed is substantially equal to the secondary speed, as well as with means for recovering, at least partly, in the form of electrical energy, the kinetic energy lost by the primary shaft and transmitting the said electrical energy to an energy storage means. The recovery of the kinetic energy of the primary shaft permits better utilization of the energy within the vehicle.

According to a special embodiment, the device is provided with an inverter. The use of the inverter as regenerative element has the advantage that a supplementary component is not needed to recover the kinetic energy of the primary shaft, inasmuch as the inverter is already present to produce supply voltages for the electrical machine.

According to a special embodiment, the energy storage means is provided with a battery coupled to an energy buffer. The energy buffer coupled to the battery permits the storage means to be capable of delivering a power corresponding to the maximum available battery power regardless of the charge level of the battery. Analogously, the energy buffer coupled to the battery permits the storage means to be capable of receiving a power corresponding to the maximum admissible battery power regardless of the charge level of the battery. Consequently, this embodiment makes it possible to enhance the driving comfort and to improve the energy utilization.

According to a special embodiment, the energy buffer is provided with at least one supercapacitor. The supercapacitors have the advantage of making it possible to achieve energy storage capacities envisioned by the invention for a limited cost and space requirement.

According to a special embodiment, the device is additionally provided with a control unit configured to charge the said electrical energy into the energy buffer during braking of the primary shaft and to discharge the energy buffer into the battery once the primary shaft is synchronized with the secondary shaft. The control unit makes it possible to manage charging and discharging of the battery and of the energy buffer.

According to a special embodiment, the control unit is provided with a chopping circuit. The chopping circuit makes it possible to discharge the energy buffer into the battery with an adapted current and to charge the energy buffer without voltage limit related to the battery.

According to a special embodiment, the control unit is configured to detect a drop of the battery charge level below a predefined low threshold and to maintain a predetermined energy level in the energy buffer in case of detection of a drop of the battery charge level below the low threshold. Thus, when the battery charge level does not permit the battery to deliver the power necessary for sufficiently fast synchronization of a downshift to the electrical machine, the energy buffer has sufficient energy to ensure the supply of power to the electrical machine.

According to a special embodiment, the battery delivers energy that makes it possible to maintain a predetermined energy level in the energy buffer after a gear change.

According to a special embodiment, the control unit is configured to supply the electrical machine with the energy contained in the energy buffer when the electrical machine delivers an accelerating torque to synchronize a primary speed of the primary shaft with a secondary speed higher than the primary speed of the secondary shaft. Thus the duration of synchronization is reduced and the driving comfort is improved.

The invention is also related to an electric or hybrid motor vehicle comprising the said device.

The invention additionally relates to a method for synchronization of a primary speed of a primary shaft receiving an electrical torque from an electrical machine, with a secondary speed lower than the primary speed of a secondary transmission shaft, wherein the primary and secondary shafts are decoupled and the primary shaft has a kinetic energy associated with the primary speed, wherein the method is characterized in that the electrical machine is commanded to deliver, in regenerative mode, an electrical braking torque to the primary shaft until the primary speed is substantially equal to the secondary speed, in such a way as to recover, at least partly, the kinetic energy of the primary shaft and to transmit the said electrical energy to a storage means.

5. LIST OF THE FIGURES

Other characteristics and innovative advantages will become apparent from the description hereinafter, given by way of indication and in no case limitative, with reference to the attached drawings, wherein:

FIG. 2b represents changes of primary speed of a primary shaft corresponding to the changes of transmission ratio of FIG. 2a;

FIG. 5b represents variations of the torque delivered by the electrical machine corresponding to the changes of transmission ratio of FIG. 5a;

6. DETAILED DESCRIPTION

Within the context of hybrid or electric vehicles equipped with an automatic transmission, the invention proposes a device for synchronization of a primary speed of a primary shaft with a secondary speed of a secondary transmission shaft in a configuration in which the primary shaft receives a torque from an electrical machine and in which the secondary speed is lower than the primary speed, i.e. in the case of an upshift. During such synchronization, the primary and secondary shafts are decoupled, or in other words the gearbox is in neutral and the vehicle is coasting. In the said configuration, the synchronization consists in controlling the electrical machine such that it delivers a braking torque to the primary shaft in order to reduce the primary speed until the difference between the primary speed and the secondary speed is smaller than a predetermined threshold. When the primary shaft is rotating, it has a kinetic energy associated with the primary speed. Now, the reduction of the primary speed leads to a decrease of the kinetic energy of the primary shaft. The invention proposes to take a portion of the kinetic energy of the primary shaft during its braking by the electrical machine and to store it rather than to dissipate it. The portion of kinetic energy is taken and transformed into electrical energy by means of a regenerative element then is delivered to an energy storage means.

Figure 3:
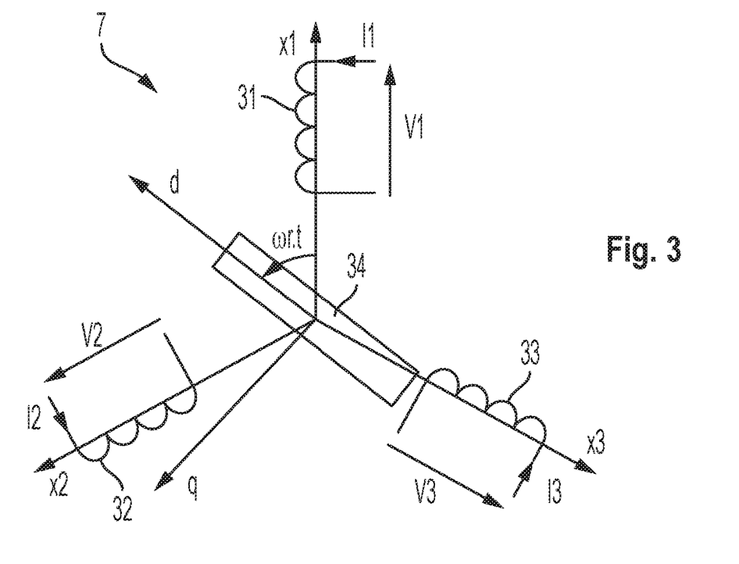
FIG. 3 is a schematic representation of an electrical machine in a Park transform according to one embodiment of the invention.

In FIG. 3, an electrical machine 7 according to the invention is schematically represented in a Park transform. As an example, electrical machine 7 is a three-phase synchronous electrical machine with permanent magnet. Electrical machine 7 is provided with a stator comprising three coils 31, 32 and 33, aligned respectively with three axes x1, x2, x3 forming angles of 2π/3 between them. Sinusoidal currents I1, I2, I3, each out of phase by 2π/3, flow respectively in the three coils 31, 32, 33. Voltages VI, V2 and V3, also sinusoidal and each out of phase by 2π/3, are applied respectively at the terminals of the three coils 31, 32, 33. The stator thus creates a rotating magnetic field in electrical machine 7. Electrical machine 7 is additionally provided with a rotor 34 provided with a permanent magnet, which becomes naturally aligned on the rotating magnetic field created by the stator, such that it rotates with an angular velocity ωr. In the configuration of the example, the angular velocity ωr is equal to the pulsation of the sinusoidal current and voltage signals. The represented Park transform has two axes d and q, wherein d is aligned with the rotating magnetic field and q is directly orthogonal to d. In the Park transform, the projections of the currents and voltages are constants.

Figure 4:
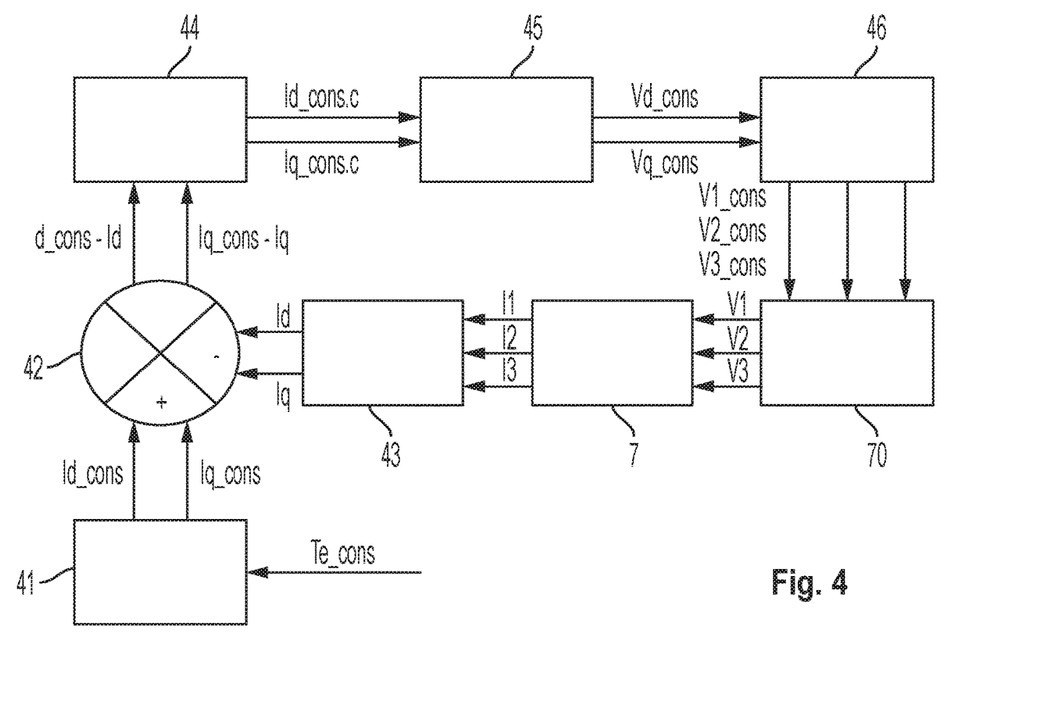
FIG. 4 is a diagram of a control structure for the electrical machine of FIG. 3.

For the purpose of delivering a controlled braking torque to the primary shaft with electrical machine 7, a control structure is proposed. FIG. 4 proposes an example of a control structure corresponding to the modeling represented in FIG. 3. The modeling of FIG. 3 makes it possible to establish the following relationships between different quantities used in the control of the electrical machine 7:

$$(E_1) \begin{cases} V_d = R_S \cdot I_d + L_d \cdot \frac{dI_d}{dt} - \omega_r \cdot L_q \cdot I_q \\ V_q = R_s \cdot I_q + L_q \cdot \frac{dI_q}{dt} + \omega_r (L_d \cdot I_d + \phi_f) \end{cases}$$

where
- $V_d$ and $V_q$ are the voltages applied respectively to axes d and q of the Park transform in volts,
- $I_d$ and $I_q$ are the currents flowing respectively on axes d and q of the Park transform in amperes,
- $R_s$ is the equivalent resistance of the stator of the electrical machine in ohms,
- $L_d$ and $L_q$ are the inductances respectively on axes d and q of the Park transform in henrys,
- $\omega_r$ is the speed of rotation of the magnetic field of the electrical machine in radians per second,
- $\Phi_f$ is the flux generated by the magnet of the rotor in webers.

With these notations, the electrical machine delivers a torque $T_e$, which is given by:

$$T_e = \Phi_f I_q + I_d I_q (L_d - L_q). \quad (E_2)$$

The above relationships make it possible to establish the control structure of FIG. 4. The input datum Te_cons corresponds to the setpoint braking torque to be delivered by electrical machine 7. A first calculation module 41 makes it possible to calculate, from the setpoint braking torque Te_cons, the setpoint currents Id_cons and Iq_cons in the Park transform in such a way as to satisfy equation E2. The setpoint currents Id_cons and Iq_cons are compared by a second calculation module 42 with the currents Id and Iq obtained from the Park transform of currents I1, I2 and I3 measured in electrical machine 7, wherein the Park transform is executed by a third calculation module 43. The comparisons of the currents Id_cons-Id and Iq_cons-Iq obtained from second calculation module 42 then make it possible, in a fourth calculation module 44, to calculate corrected current setpoints Id_cons.c and Iq_cons.c. From the corrected current setpoints Id_cons.c and Iq_cons.c, voltage setpoints in the Park transform Vd_cons and Vq_cons are calculated in a fifth calculation module 45, in accordance with equation system E1. A sixth calculation module 46 executes an inverse Park transform starting from the voltage setpoints in the Park transform Vd_cons and Vq_cons, in order to obtain the real voltage setpoints V1_cons, V2_cons and V3_cons. An inverter 70 applies, to electrical machine 7, sinusoidal voltages V1, V2 and V3 in accordance with the real voltage setpoints V1_cons, V2_cons and V3_cons.

Braking torque Te obtained by applying the setpoint braking torque Te_cons is maintained until the difference between the primary speed and the secondary speed drops below a predetermined threshold value.

Inverter 70 is configured to take a portion of the kinetic energy lost by the primary shaft during its braking to transform this portion of kinetic energy to electrical energy and to transmit the said electrical energy to an energy storage means, for example a battery. In this example, inverter 70 is a regenerative element.

Figure 5A:
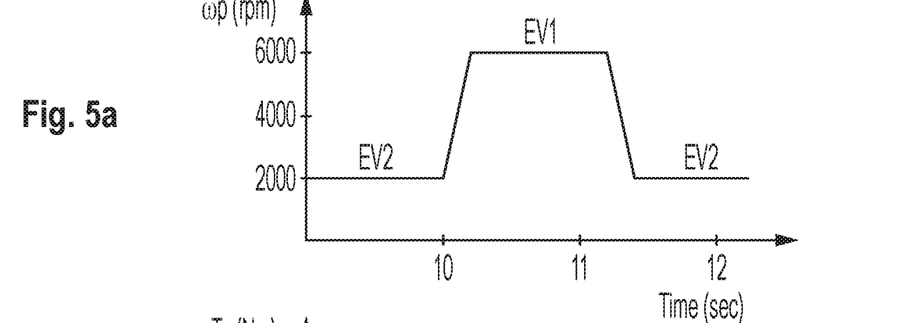
FIG. 5a represents changes of transmission ratios in the course of time according to one embodiment of the invention.
Figure 5B:
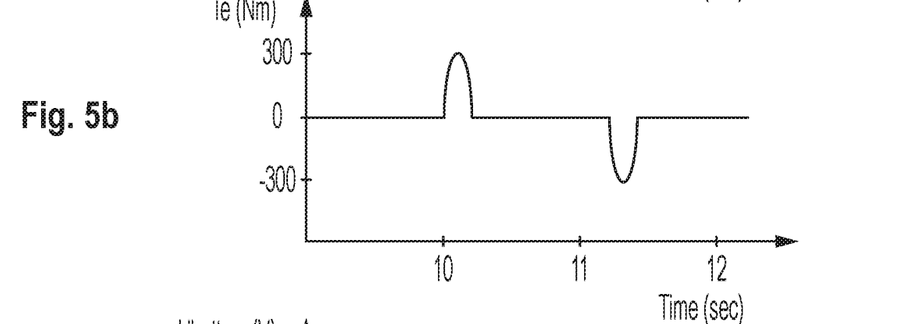
Figure 5C:
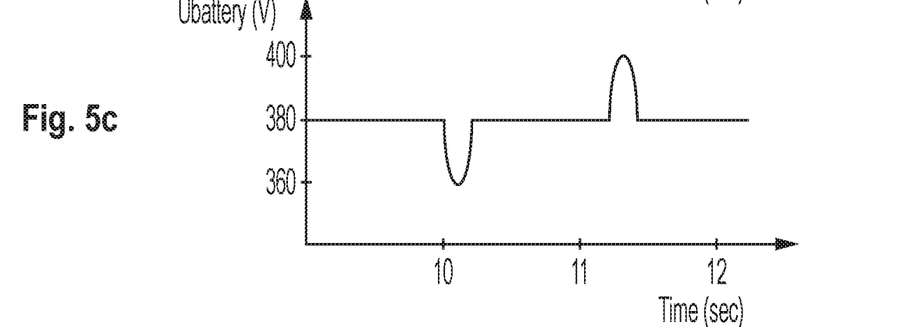
FIG. 5c represents variations of the voltage at the battery terminals corresponding to the variations of the torque delivered by the electrical machine of FIG. 5b.

FIGS. 5a, 5b and 5c show that, during an upshift of transmission ratio, for example from EV1 to EV2, electrical machine 7 delivers a negative torque Te in order to reduce the primary speed ωp, which changes, for example, from 6000 rpm to 2000 rpm. In this context, the inverter sends electrical energy obtained from the kinetic energy of the primary shaft to the battery, and so the voltage Ubattery at the battery terminals increases. Conversely, during a downshift of transmission ratio, for example from EV2 to EV1, electrical machine 7 delivers a positive torque Te in order to increase the primary speed ωp, which changes, for example, from 2000 rpm to 6000 rpm. In this context, the inverter takes electrical energy from the battery, and so the voltage Ubattery at the battery terminals decreases.

Figure 6:
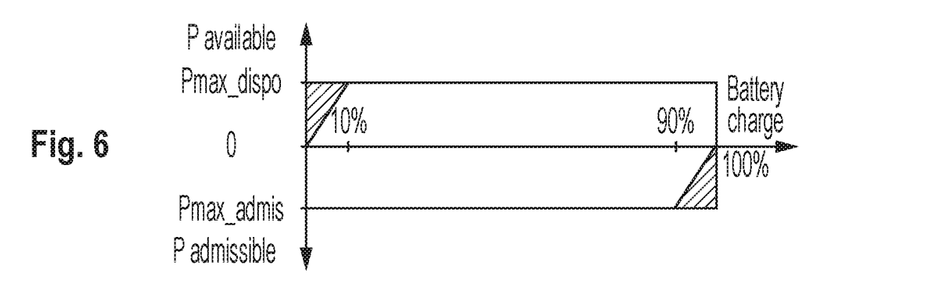
FIG. 6 represents the power available in the battery and the power acceptable by the battery as a function of the battery charge level with and without energy buffer.

FIG. 6 shows the available power Pavailable that the battery is able to deliver and the admissible power Padmissible that the battery is able to accept, as a function of the battery charge level. Considering a traditional configuration, i.e. the non-shaded portion of the graph, when the battery charge level is low, for example when the battery charge level is lower than 10%, the battery is able to deliver only a limited power Pavailable, lower than the power Pmax_dispo available when the charge level is higher than 10%. Consequently, the battery is unable to deliver a voltage Ubattery sufficient to synchronize the primary and secondary shafts in a time sufficiently short to assure good driving comfort. Analogously, when the battery charge level is high, for example when the charge level is higher than 90%, the battery is able to accept only a limited power Padmissible, lower than the power Pmax_admis accepted when the charge level is lower than 90%. Consequently, the battery is unable to accept a voltage Ubattery sufficient to synchronize the primary and secondary shafts in a time sufficiently short to assure good driving comfort. In this situation, the reduction of the primary speed takes place by mechanical losses, and the kinetic energy corresponding to the reduction of the primary speed is dissipated. This situation leads to the double disadvantage of poor driving comfort and poor energy utilization. The invention proposes to couple an energy buffer with the battery in order to ensure optimum functioning, including in limit situations where the charge level is lower than 10% or higher than 90%. The optimum functioning corresponds to an available power Pavailable equal to Pmax_dispo and to an admissible power Padmissible equal to Pmax_admis regardless of the battery charge level, as represented in FIG. 6 by the combination of the shaded portion and of the non-shaded portion of the graph.

From a viewpoint of dimensioning of the energy buffer and for purely illustrative purposes, for a nominal power of the electrical machine on the order of 50 kW and a synchronization duration on the order of 200 ms, the energy buffer must be dimensioned to accept or deliver a power of 50 kW and to accept or deliver an energy of 10 kJ. As an example, the energy buffer is an assembly of supercapacitors in series in such a way as to obtain an equivalent capacitance of 50 mF, wherein the supercapacitors have the advantage of making it possible to attain the envisioned energy storage capacities for a limited cost and space requirement.

Figure 7:
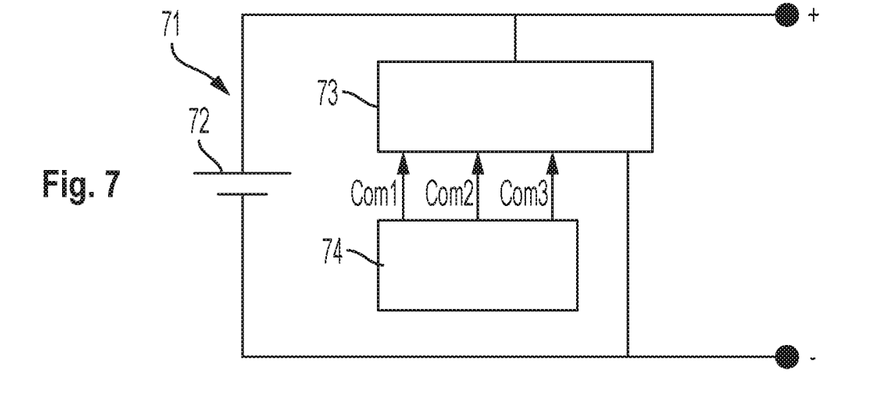
FIG. 7 is a functional diagram of an energy storage means provided with an energy buffer according to one embodiment of the invention.

FIG. 7 represents a storage means 71 provided with a battery 72 and an energy buffer 73 controlled by a control unit 74.

Figure 8:
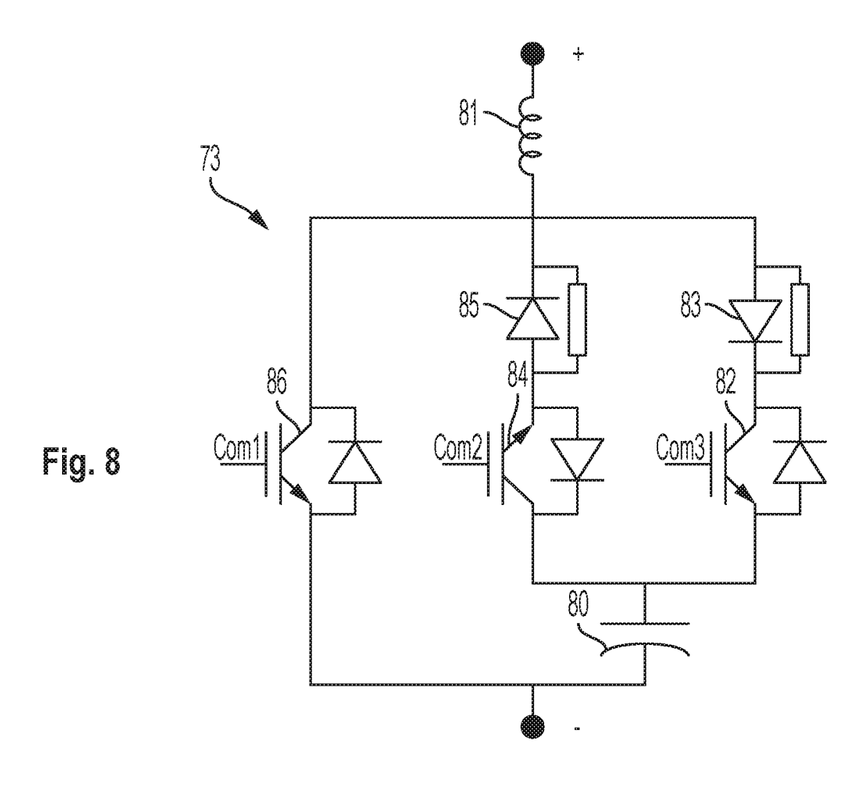
FIG. 8 is a functional diagram of the energy buffer of FIG. 7 and of its control unit.

FIG. 8 represents the energy buffer 73 of FIG. 7. Energy buffer 73 is provided with an assembly of supercapacitors 80 in series and a coil 81 making it possible to store the energy in a first step in order to restitute the energy in a second step. Energy buffer 73 is also provided with two transistors 82 and 84 controlled by way respectively of Com2 and Com2 of control unit 74 and coupled respectively to diodes 83 and 85, which dictate the direction of the current. Diode 83 dictates a current direction corresponding to the charge of the assembly of supercapacitors 80, and diode 85 dictates a current direction corresponding to the discharge of the assembly of supercapacitors. Consequently, to command the charging of energy buffer 73, control unit 74 commands closing of transistor 82 and opening of transistor 84 and vice versa for discharging. Energy buffer 73 is additionally provided with a transistor 86 capable of chopping the voltage at the terminals of the assembly of supercapacitors 80. In the phase of charging of energy buffer 73, when the voltage at the terminals of the assembly of supercapacitors 80 is lower than the voltage at the battery terminals, control unit 74 commands opening of transistor 86. When the ratio of the voltages at the terminals of the assembly of supercapacitors and of the battery is inverted, control unit 74 commands closing and opening cycles of transistor 86 in such a way as to chop the voltage at the terminals of supercapacitors 80 in order to return the mean voltage at the terminals of the assembly of supercapacitors 80 to below the battery voltage and thus to continue to charge the energy buffer. In the phase of discharging of the energy buffer into the battery, control unit also commands transistor 86 in such a way as to chop the voltage at the terminals of the assembly of supercapacitors in order to regulate the recharging current sent to battery 72.

In order to ensure good driving comfort in case of low battery charge level, control unit 74 is configured to detect a drop of the battery charge level below a predefined low threshold and, as the case may be, to command the supply of energy buffer 73 by the battery in order to maintain, in the energy buffer, a predetermined energy level that makes it possible to achieve speed synchronization with the maximum admissible power. Over a vehicle communication network, commonly known as CAN, the battery sends out information necessary for control unit 74 to detect a drop of the battery charge level below a predefined low threshold. Concerning energy buffer 73, a voltage-measuring component makes it possible to evaluate the energy stored in the energy buffer.

In the foregoing, the invention has been described by way of example. It will be understood that the person skilled in the art is able to realize different variants of embodiments of the invention, by associating, for example, the different characteristics hereinabove taken alone or in combination, and of doing so without departing from the scope of the invention.

The invention claimed is:

1. A device for synchronization of a primary speed of a primary shaft receiving an electrical torque from an electrical machine, with a secondary speed lower than the primary speed of a secondary transmission shaft, wherein the primary shaft and the secondary shaft are decoupled and the primary shaft has a kinetic energy associated with the primary speed, the device comprising:
    means for delivering an electrical braking torque to the primary shaft until the primary speed is substantially equal to the secondary speed;
    means for recovering, at least partly, in the form of electrical energy, the kinetic energy lost by the primary shaft and transmitting the electrical energy to an energy storage means, the energy storage means including a battery coupled to an energy buffer; and
    a control unit configured to charge the electrical energy into the energy buffer during braking of the primary shaft and to discharge the energy buffer into the battery once the primary shaft is synchronized.

2. The device according to claim 1, further comprising an inverter.

3. The device according to claim 1, wherein the energy buffer includes at least one supercapacitor.

4. The device according to claim 1, wherein the control unit includes a chopping circuit.

5. The device according to claim 1, wherein the control unit is configured to detect a drop of the charge level of the battery below a predefined low threshold and to maintain a predetermined energy level in the energy buffer in case of detection of a drop of the charge level of the battery below the low threshold.

6. The device according to claim 5, wherein the control unit is configured to supply the electrical machine with the energy contained in the energy buffer when the electrical machine delivers an accelerating torque to synchronize the primary speed of the primary shaft with the secondary speed higher than the primary speed of the secondary shaft.

7. An electric or hybrid motor vehicle comprising:
    the device according to claim 1.

8. The device according to claim 1, wherein the means for delivering the electrical braking torque to the primary shaft includes the electrical machine.

9. The device according to claim 8, wherein the means for recovering the kinetic energy lost by the primary shaft and transmitting the electrical energy to the energy storage means includes an inverter.

10. The device according to claim 1, wherein the means for recovering the kinetic energy lost by the primary shaft and transmitting the electrical energy to the energy storage means includes an inverter.

11. The device according to claim 1, wherein the energy buffer includes an assembly of supercapacitors in series, a coil, and two transistors coupled respectively to a first diode and a second diode to control a direction of current to or from the assembly of supercapacitors.

12. A method for synchronization of a primary speed of a primary shaft receiving an electrical torque from an electrical machine, with a secondary speed lower than the primary speed of a secondary transmission shaft, wherein the primary shaft and the secondary shaft are decoupled and the primary shaft has a kinetic energy associated with the primary speed, the method comprising:

commanding the electrical machine to supply, in regenerative mode, an electrical braking torque to the primary shaft until the primary speed is substantially equal to the secondary speed, in such a way as to recover, at least partly, the kinetic energy of the primary shaft and to transmit the electrical energy to a storage means the energy storage means including a battery coupled to an energy buffer, and the electrical energy is charged into the energy buffer during braking of the primary shaft and discharged from the energy buffer into the battery once the primary shaft is synchronized.

13. The method according to claim 12, further comprising detecting a drop of the charge level of the battery below a predefined low threshold and maintaining a predetermined energy level in the energy buffer in case of detection the drop of the charge level of the battery below the low threshold.

14. The method according to claim 13, further comprising supplying the electrical machine with the energy contained in the energy buffer when the electrical machine delivers an accelerating torque to synchronize the primary speed of the primary shaft with the secondary speed higher than the primary speed of the secondary shaft.

\* \* \* \* \*